N. P. LUCAS.
FOOD GRINDER.
APPLICATION FILED MAY 6, 1914.
1,155,749.
Patented Oct. 5, 1915.
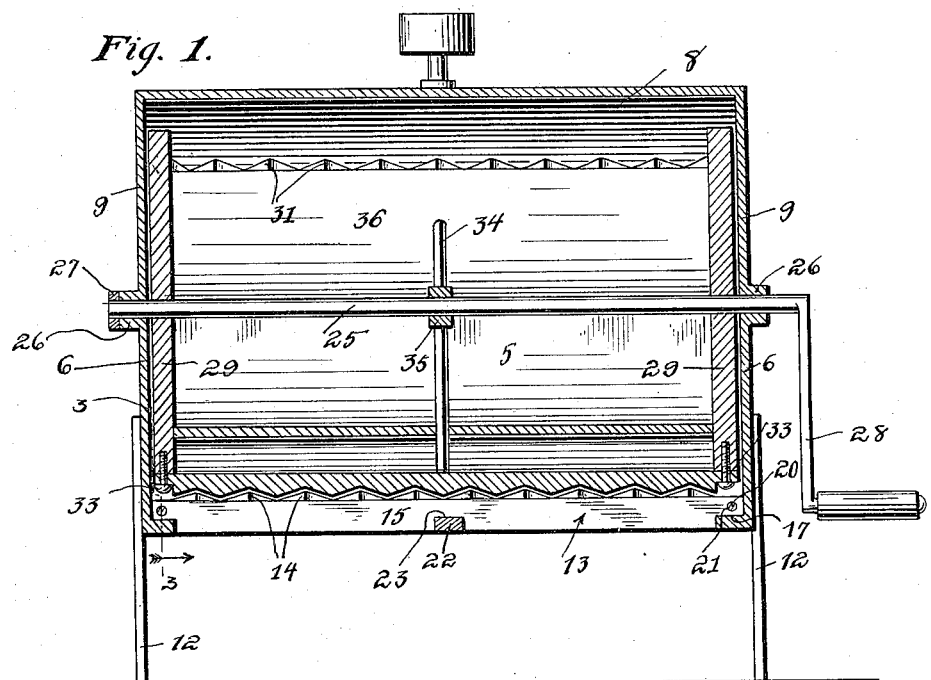
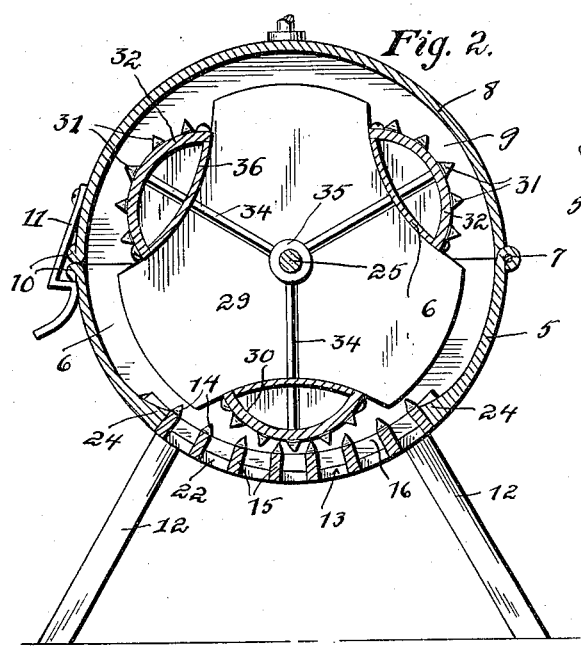
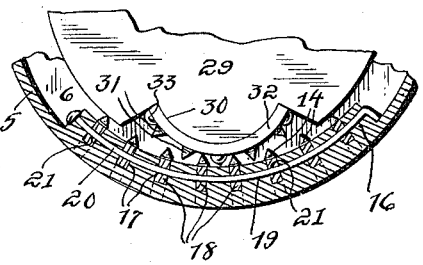
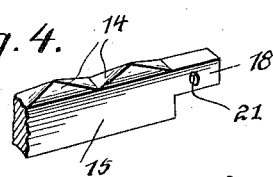
Inventor
N. P. Lucas.

UNITED STATES PATENT OFFICE.

NANNIE P. LUCAS, OF WASHINGTON, DISTRICT OF COLUMBIA.

FOOD-GRINDER.

1,155,749.     Specification of Letters Patent.     Patented Oct. 5, 1915.

Application filed May 6, 1914. Serial No. 836,645.

*To all whom it may concern:*

Be it known that I, NANNIE P. LUCAS, a citizen of the United States, residing at Washington, in the District of Columbia, have invented new and useful Improvements in Food-Grinders, of which the following is a specification.

This invention relates to new and useful improvements in culinary utensils and particularly to food grinders.

The present application is an improvement on the structure shown in Patent #706,837, granted to me August 12, 1902, and its object resides generally in strengthening the structure shown in the previous patents, and in so arranging the parts of the structure that they may be readily assembled or removed as desired to facilitate cleaning or for any other purpose, it being further the object to so modify the cutting or grinding members that they are adapted for cutting meats and the like and to provide for the ready removal and replacing of the cutting elements for cleaning or replacing.

A further object of the invention resides in the provision in a device of the class described, of means whereby material to be ground is prevented from seating in the concaved inner faces of the cutting blade.

With these and other objects in view, the invention resides in the novel combination, formation and arrangement of parts to be hereinafter described and illustrated in the accompanying drawings and particularly pointed out in the claims hereto appended.

Reference is had to the accompanying drawings wherein similar characters of reference designate corresponding parts throughout the several views, and in which:

Figure 1 is a central vertical longitudinal sectional view through the grinder, Fig. 2 is a transverse section taken therethrough, Fig. 3 is a sectional view on the line 3—3 of Fig. 1, and Fig. 4 is a detail perspective of one of the tooth members.

Referring now more particularly to the accompanying drawings, the body portion of the device comprises a trough 5, substantially semi-circular in cross section and closed at each end by the semi-circular wall 6. Hinged at 7 to one side edge of the trough 5 is the cover of the device which comprises a member 8 of shape similar to the trough and closed at its ends by the semi-circular walls 9. The free side edges of the wall and cover are provided with beads 10 and secured to the cover adjacent its free side edge is a clip 11 which is adapted to engage the bead 10 of the trough to hold the cover closed. The cover and trough thus form a hollow cylindrical member. Depending from the trough are the supporting legs 12 whereby the grinder is held spaced from the table or other suitable support so that a receptacle may be placed under the grinder to receive the ground food.

The bottom part of the trough is cut away to provide an open space 13 and the fixed teeth of the grinder are disposed in spaced longitudinal rows across this open space and are engaged by rotary teeth to be hereinafter described so that upon actuation of the device the food is ground or cut and drops between the rows of teeth into the receptacle provided.

The fixed teeth 14 of the grinder are pyramidical in shape and are formed integrally in longitudinal rows upon the top faces of supporting bars 15. To detachably secure these supporting bars longitudinally in spaced relation in the opening 13, each end wall 6 is provided adjacent said opening with an arcuate rib 16. The ribs are provided with sockets 17 which seat reduced end portions 18 of the supporting bars. To lock the supporting bars in this position, the ribs are provided with longitudinal arcuate openings 19 and flexible retaining members 20 are passed through these openings and through alining openings 21 provided in the reduced end portions 18 of the supporting bars. The central portions of the supporting bars, or tooth bars as they may be called, are braced by means of a bar member 22 which extends transversely of the opening 13 and which engages in cutaway portions 23 of the under faces of the toothed bars 15. The trough 5 adjacent the sides of the opening 13 has its wall thickened as at 24 and the bar 22 is preferably made integral with said thickened portion. Thus the tooth bars 15 may be readily secured in the grinder and removed therefrom for the purpose of renewal or cleaning. It is further noted that comparatively no strain comes upon the flexible holding members 20, as the bars are supported on the ribs 16 and on the bar 22.

The movable teeth of the grinder are carried by a rotary member which includes a shaft 25 journaled adjacent its ends in bearings formed by coacting grooved lateral extensions 26 formed at the meeting edges of the end walls of the trough 5 and the cover 8, the axis of said shaft coinciding with the axis of the trough and cover. Secured at one end of the shaft is a retaining collar 27 and secured to the other end of the shaft is a crank handle 28. A plate 29 is fixed to each end portion of the shaft adjacent and inwardly of each pair of end walls 6 and 9. These plates are circular and of less diameter than the diameter of the grinder. The plates are provided on their peripheries with spaced cutaway portions 30 which present an arcuate surface of less diameter than the diameter of the plate. The movable teeth 31 of the grinder are also pyramidical in shape and are formed integrally in spaced longitudinal rows on the outer faces of base strips 32 which are arcuate in cross section and which have the curves of their inner faces coinciding with the curves of the faces of the cutaway portions 30 so that they may be positioned by securing their end portions on the arcuate faces of the said cutaway portions, preferably by the screws 33. The central portions of the strips are braced by bars 34 which extend radially from a sleeve 35 on the shaft 25.

By referring particularly to Fig. 2 of the drawings, it will be noted that the curvature of the strips is greater than the curvature of the trough, as in my previous patent, the advantage of this being that the food is drawn between the teeth, and not pushed aside by the strips. In this operation, comparatively great strain is exerted at the sides of the strips which tends to rock them on their securing means. By the provision of the end plates 29, however, this action is prevented.

To keep food from lodging in the concaved portions of the strips and to also facilitate the cleaning of the device, arcuate shield plates 36 are disposed between the plates 29 and each has its side edges integrally or otherwise secured to the side edges of a respective strip 32, said shield plates presenting a convexed surface.

In the operation of the device, the cover is removed and food is placed in the trough and the cover then closed and fastened by the clip 11, which may be of any desired form. The shaft 25 is then rotated in either direction and the food is engaged between the movable and fixed teeth and reduced to such form that it will readily pass through the spaces between the bars 15. It is noted that when the device is actuated the apexes of the movable teeth pass adjacent the bases of the fixed teeth and vice versa, so that the cutting action is readily effected.

It will be understood that various minor changes and modifications within the scope of the appended claims may be resorted to without departing in any manner from the spirit of the invention.

What is claimed is:

1. In a structure of the class described, the combination with a trough substantially semi-circular in cross section, of fixed cutting teeth carried thereby, a shaft journaled on the trough, circular plates fixed on the shafts inwardly of the ends of the trough and provided on their peripheries with cutaway portions presenting curved surfaces, longitudinal curved strips of greater curvature than the curvature of the trough, and having the end portions of their inner faces coincident with and secured to the faces of the said cutaway portions and cutting teeth disposed on the faces of the strips.

2. In a structure of the class described, the combination with a trough substantially semi-circular in cross section, of a rotary member journaled thereon and extending therein, arcuate tooth-carrying strips of greater curvature than the curvature of the trough secured to the rotary member and longitudinally bowed shield strips having their side edges secured to the side edges of the tooth carrying strips.

3. In a structure of the class described, a trough comprising a member substantially semi-circular in cross section, a tooth carrying rotary member journally carried by the trough, the base of the trough being provided with a longitudinal opening, arcuate ribs formed on the inner faces of the end walls adjacent said openings and provided with a plurality of spaced recesses opening upon the upper and inner faces of the ribs and with longitudinal arcuate openings, a plurality of tooth carrying bars, reduced ends on said bars seating in the sockets and provided with openings and flexible retaining members passed through the longitudinal openings of the ribs and the openings of the ends.

In testimony whereof I have hereunto set my hand in presence of two subscribing witnesses.

NANNIE P. LUCAS.

Witnesses:
Wm. J. Conway,
Alice V. Bolden.

Copies of this patent may be obtained for five cents each, by addressing the "Commissioner of Patents, Washington, D. C."